United States Patent
Sonoda et al.

(10) Patent No.: US 10,493,576 B2
(45) Date of Patent: Dec. 3, 2019

(54) SERVO CONTROL DEVICE, SPINDLE FAILURE DETECTION METHOD USING SERVO CONTROL DEVICE, AND NON-TRANSITORY COMPUTER READABLE MEDIUM ENCODED WITH COMPUTER PROGRAM

(71) Applicant: FANUC CORPORATION, Yamanashi (JP)

(72) Inventors: Naoto Sonoda, Yamanashi (JP); Yuusaku Oho, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/671,576

(22) Filed: Aug. 8, 2017

(65) Prior Publication Data
US 2018/0043488 A1    Feb. 15, 2018

(30) Foreign Application Priority Data
Aug. 9, 2016 (JP) .................... 2016-156933

(51) Int. Cl.
*B23Q 5/58* (2006.01)
*B23Q 17/00* (2006.01)
*G05B 19/4065* (2006.01)

(52) U.S. Cl.
CPC .......... *B23Q 5/58* (2013.01); *B23Q 17/007* (2013.01); *G05B 19/4065* (2013.01); *G05B 2219/37245* (2013.01)

(58) Field of Classification Search
CPC ........ B23Q 5/58; B23Q 17/007; B23Q 17/09; G05B 19/4065; G05B 2219/37245
See application file for complete search history.

(56) References Cited

U.S. PATENT DOCUMENTS

| 4,437,163 | A | * | 3/1984 | Kurihara | ............... G07C 3/00 |
| | | | | | 702/56 |
| 5,523,701 | A | * | 6/1996 | Smith | ............ B23Q 17/0961 |
| | | | | | 324/117 H |

(Continued)

FOREIGN PATENT DOCUMENTS

| JP | 56-014135 | 2/1981 |
| JP | 57-021251 | 2/1982 |

(Continued)

OTHER PUBLICATIONS

Notification of Reasons for Refusal dated May 29, 2018 in Japanese Patent Application No. 2016-156933.

(Continued)

*Primary Examiner* — Rocio Del Mar Perez-Velez
*Assistant Examiner* — Olvin Lopez Alvarez
(74) *Attorney, Agent, or Firm* — Wenderoth, Lind & Ponack, L.L.P.

(57) ABSTRACT

To provide an arrangement capable of detecting spindle failure in a machine tool using an existing servo control device, without providing separate external sensors, a failure analysis device or the like. A servo control device (22), which detects failure of a spindle of a machine tool including the spindle, a feed shaft, and a positioning servomotor that is installed to the feed shaft and is for deciding the position of the spindle, includes: a feedback acquisition unit (222) that acquires a feedback signal of the positioning servomotor; and an analysis/detection unit 226 that analyzes the feedback signal acquired to detect failure of the spindle.

7 Claims, 4 Drawing Sheets

(56) References Cited

U.S. PATENT DOCUMENTS

| | | | | |
|---|---|---|---|---|
| 5,726,905 | A * | 3/1998 | Yazici | G01M 13/04 324/545 |
| 6,006,170 | A * | 12/1999 | Marcantonio | G01R 31/343 318/806 |
| 6,196,772 | B1 * | 3/2001 | Thames | B23Q 5/326 408/1 R |
| 7,539,549 | B1 * | 5/2009 | Discenzo | F04D 15/0077 324/765.01 |
| 2003/0047584 | A1 * | 3/2003 | Okamoto | B23K 20/123 228/2.1 |
| 2004/0217873 | A1 * | 11/2004 | Schweitzer | G05B 19/4065 340/680 |
| 2007/0225849 | A1 * | 9/2007 | Norbeck | F24F 11/30 700/107 |
| 2008/0091383 | A1 * | 4/2008 | Ueno | G05B 23/0256 702/185 |
| 2008/0234964 | A1 * | 9/2008 | Miyasaka | G01H 1/003 702/113 |
| 2009/0030545 | A1 * | 1/2009 | Masuya | B23Q 17/12 700/175 |
| 2009/0093975 | A1 * | 4/2009 | Judd | G01H 13/00 702/34 |
| 2009/0171594 | A1 * | 7/2009 | Norihisa | G05B 19/4065 702/34 |
| 2009/0292505 | A1 * | 11/2009 | Van Dyke | G01H 1/00 702/184 |
| 2010/0010662 | A1 * | 1/2010 | Inagaki | B23Q 11/0039 700/175 |
| 2011/0238329 | A1 * | 9/2011 | Saarinen | G01M 13/021 702/44 |
| 2012/0095724 | A1 * | 4/2012 | Ando | B23Q 17/007 702/145 |
| 2015/0352679 | A1 * | 12/2015 | Yamamoto | G05B 19/4061 73/865.8 |
| 2016/0297043 | A1 * | 10/2016 | Inaguchi | B23Q 17/008 |
| 2016/0327452 | A1 * | 11/2016 | Vilar | G01M 13/04 |
| 2016/0341631 | A1 * | 11/2016 | Kamiya | G01M 13/00 |
| 2016/0346891 | A1 * | 12/2016 | Ando | G05B 19/404 |
| 2017/0108406 | A1 * | 4/2017 | Thomson | G01M 13/045 |
| 2017/0205797 | A1 * | 7/2017 | Bohner | G05B 19/182 |
| 2017/0315516 | A1 * | 11/2017 | Kozionov | G01H 1/003 |
| 2017/0315535 | A1 * | 11/2017 | Ishii | G05B 19/402 |
| 2018/0026565 | A1 * | 1/2018 | Nakaminami | H02P 23/14 318/490 |
| 2018/0043492 | A1 * | 2/2018 | Ando | B23Q 17/007 |
| 2018/0354088 | A1 * | 12/2018 | Matsushita | B23Q 15/12 |
| 2019/0003924 | A1 * | 1/2019 | Hongo | G01M 7/00 |

FOREIGN PATENT DOCUMENTS

| | | | |
|---|---|---|---|
| JP | 57-138557 | 8/1982 | |
| JP | 58-102656 | 6/1983 | |
| JP | 59-49145 | 11/1984 | |
| JP | 01-205958 | 8/1989 | |
| JP | 03-054435 | 3/1991 | |
| JP | 04-005542 | 1/1992 | |
| JP | 04-063662 | 2/1992 | |
| JP | 04-176541 | 6/1992 | |
| JP | 04-269153 | 9/1992 | |
| JP | 08314516 | * 11/1996 | G05B 19/4065 |
| JP | 09-168909 | 6/1997 | |
| JP | 11-296213 | 10/1999 | |
| JP | 2001-047342 | 2/2001 | |
| JP | 2001-125611 | 5/2001 | |
| JP | 2001-150287 | 6/2001 | |
| JP | 2005-74545 | 3/2005 | |
| JP | 2006-138756 | 6/2006 | |
| JP | 2009-226551 | 10/2009 | |
| JP | 2001-060076 | 3/2011 | |
| JP | 2012-086346 | 5/2012 | |
| JP | 2015-074074 | 4/2015 | |
| JP | 2016-135511 | 7/2016 | |
| JP | 2017-049642 | 3/2017 | |

OTHER PUBLICATIONS

Notification of Reasons for Refusal issued in the Japanese Patent Application No. 2016-156933, dated Jan. 8, 2019.

* cited by examiner

1

SERVO CONTROL DEVICE, SPINDLE FAILURE DETECTION METHOD USING SERVO CONTROL DEVICE, AND NON-TRANSITORY COMPUTER READABLE MEDIUM ENCODED WITH COMPUTER PROGRAM

This application is based on and claims the benefit of priority from Japanese Patent Application No. 2016-156933, filed on 9 Aug. 2016, the content of which is incorporated herein by reference.

BACKGROUND OF THE INVENTION

Field of the Invention

The present invention relates to a device for detecting spindle failure in a machine tool during operation. In particular, it relates to a servo control device for a machine tool, which detects spindle failure of this machine tool, and a non-transitory computer readable medium encoded with a computer program. In addition, it relates to a spindle failure detection method using this servo control device.

Related Art

Conventionally, during operation of a machine tool, if spindle failure thereof occurs, the machining precision on a workpiece which is the machining target will decline, and there is a possibility of producing a defective workpiece. Herein, "spindle failure" refers to the matter of damage, wear, deformation of each part of the spindle, and entering a state in which each part of the spindle cannot exhibit the original function thereof, and for example, a case of a bearing of the spindle, etc. being damaged can be exemplified. Damage/wear/deformation of components pertaining (installed) to the spindle, and the matter of entering a state in which these components cannot exhibit the functions thereof, may be encompassed by "spindle failure".

As one technique for avoiding a decline, etc. in machining precision of a workpiece caused by spindle failure in this way, it has been considered to adopt a device that detects spindle failure. For example, in a case of a bearing or the like of the spindle being damaged, it has been known that vibrations of a specific frequency will generate according to the balls (steel balls), etc. constituting the bearing in the thrust direction and radial direction of the spindle. Therefore, it has been considered to install an AE (Acoustic Emission) sensor or acceleration sensor to the spindle so as to configure a device that detects anomalies by analyzing these sensor outputs.

For a machine tool in the case of installing sensors to the spindle and using a device that analyzes the sensor output thereof in this way, a block diagram of the configuration for detecting anomalies is shown in FIG. 4. First, as shown in FIG. 4, sensors 12a, 12b are installed to the spindle 10. Herein, the sensor 12a is an AE sensor, and the sensor 12b may be set as an acceleration sensor, for example. The output signals of these sensors 12a, 12b are amplified by an amplifier 14, and supplied to an analysis device 16. The analysis device 16 is a computer, for example, and in the case of analyzing the output signals of the sensors 12a, 12b and determining that an anomaly is occurring, externally outputs a failure detection signal. A program of the computer, which is the analysis device 16, executes analysis of the output signals of the sensors 12a, 12b by a predetermined algorithm, to determine whether or not an anomaly is occurring. In addition, the principle of such an analysis device 16, and a method of detecting spindle failure using a device such as the analysis device 16 are disclosed in Patent Document 1, for example.

On the other hand, a method of detecting failure of each part of a machine tool by detecting the load fluctuation from the electrical current value of the spindle motor or the like is disclosed in Patent Document 2. The method disclosed in this document has the object of mainly performing detection of load fluctuation, particularly damage of the tool, based on load fluctuation.

Patent Document 1: Japanese Unexamined Patent Application, Publication No. 2005-74545
Patent Document 2: Japanese Examined Patent Application Publication No. S59-49145

SUMMARY OF THE INVENTION

However, with the technology of Patent Document 1 using the new sensor 12, it is necessary to add the new sensor 12 and/or an analysis device 16, and thus the device configuration becomes complex. Furthermore, installation space for this sensor 12 and/or analysis device 16 becomes necessary.

In addition, with the technology of Patent Document 2 detecting the load variation from the electric current value of the motor, although it is possible to detect phenomena relating to load, it is difficult to detect spindle failure such as damage to bearings.

The present invention has been made taking account of the above-mentioned problems, and has an object of providing an arrangement capable of detecting spindle failure of a machine tool using an existing servo control device, without providing additional externals sensors, a failure analysis device, or the like.

According to a first aspect of the present invention, in a servo control device (e.g., the servo control device 22 described later) that detects failure of a spindle in a machine tool including the spindle, a feed shaft, and a positioning servomotor (e.g., the servomotor 20 described later) that is installed to the feed shaft and is for deciding a position of the spindle, the servo control device includes: a feedback acquisition unit (e.g., the feedback acquisition unit 222 described later) that acquires a feedback signal of the positioning servomotor; and an analysis/detection unit (e.g., the analysis/detection unit 226 described later) that analyzes the feedback signal acquired to detect failure of the spindle.

According to a second aspect of the present invention, in the servo control device as described in the first aspect, the feedback signal may be at least one of any type of signal among an electrical current, velocity and position of the positioning servomotor.

According to a third aspect of the present invention, in the servo control device as described in the first or second aspect, the analysis/detection unit may analyze the feedback signal based on any among an operating state of the positioning servomotor, operating state of the spindle, and start signal of a higher-level control device, and determine a timing for detecting failure of the spindle.

According to a fourth aspect of the present invention, in the servo control device as described in any one of the first to third aspects, the analysis/detection unit may conduct Fourier transformation on the feedback signal to obtain a spectrum of a predetermined frequency range, and determine that failure has occurred in the spindle in a case of a signal intensity of the spectrum of the predetermined frequency range exceeding a predetermined first threshold.

According to a fifth aspect of the present invention, in the servo control device as described in any one of the first to third aspects, the analysis/detection unit may obtain a spectrum of a predetermined frequency range by conducting Fourier transformation on the feedback signal, and include a storage unit (e.g., the storage unit described later) that stores an initial signal intensity of the spectrum of the predetermined frequency range, and may determine that failure has occurred in the spindle in a case of a difference between the signal intensity of the spectrum of the predetermined frequency range and the initial signal intensity of the spectrum of the predetermined frequency range stored in the storage unit exceeding a predetermined second threshold.

According to a sixth aspect of the present invention, the servo control device as described in any one of the first to fifth aspects may further include a notification unit (e.g., the notification unit described later) that externally notifies of failure of the spindle detected by the analysis/detection unit.

According to a seventh aspect of the present invention, the servo control device as described in any one of the first to fifth aspects may further include a notification unit that externally outputs a failure detection signal (e.g., the failure detection signal described later), in a case of the analysis/detection unit detecting failure of the spindle.

According to an eighth aspect of the present invention, the servo control device as described in any one of the first to seventh aspects may further include a retracting unit (e.g., the retracting unit described later) that outputs a command causing the spindle to retract from a workpiece, in a case of the analysis/detection unit detecting failure of the spindle.

A spindle failure detection method according to the present invention is a method for detecting failure of a spindle of a machine tool including the spindle, a feed shaft, and a positioning servomotor that is installed to the feed shaft and is for deciding a position of the spindle, the method including the steps of: acquiring a feedback signal of the positioning servomotor; and analyzing the feedback signal thus acquired to detect failure of the spindle.

A non-transitory computer readable medium encoded with a computer program according to the present invention is a non-transitory computer readable medium encoded with a computer program enabling a computer to operate as a servo control device that detects failure of a spindle of a machine tool including the spindle, a feed shaft, and a positioning servomotor that is installed to the feed shaft and is for deciding a position of the spindle, wherein the computer program causes the computer to execute: feedback acquisition processing of acquiring a feedback signal of the positioning servomotor; and analysis/detection processing of analyzing the feedback signal thus acquired to detect failure of the spindle.

According to the present invention, it is possible to provide an arrangement capable of detecting spindle failure of a machine tool using an existing servo control device, without providing additional externals sensors, a failure analysis device, or the like.

DETAILED DESCRIPTION OF THE INVENTION

Hereinafter, an embodiment of the present invention will be explained based on the drawings.

1. Positioning of Motor Control Device in Present Embodiment

Figure 1:
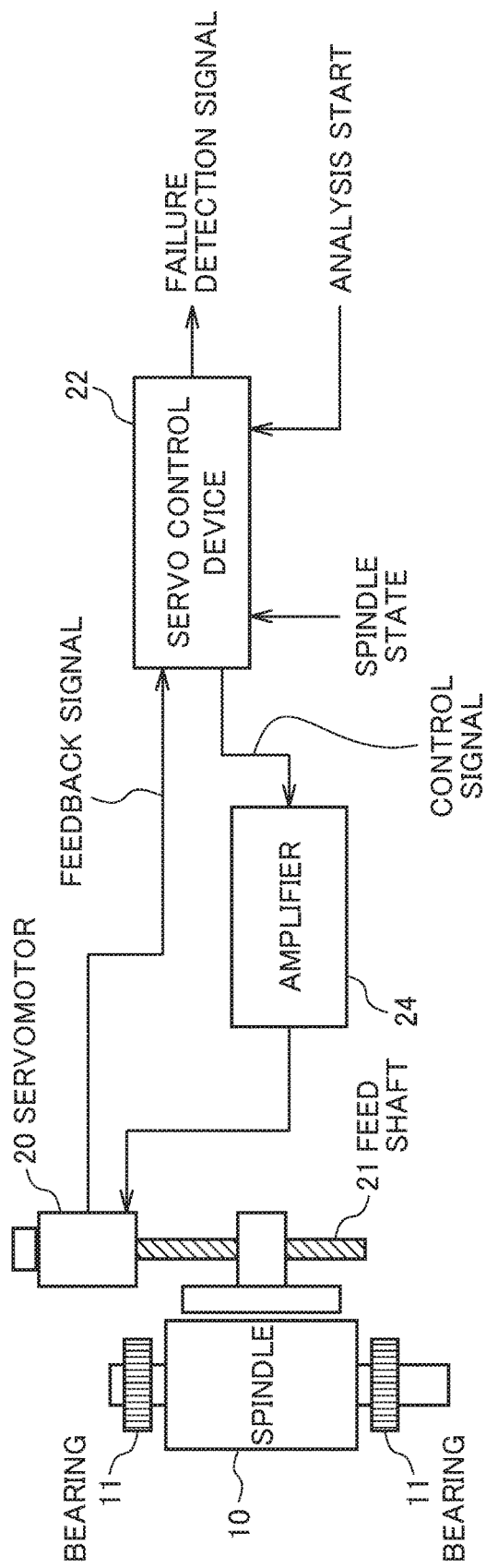
FIG. 1 is a view showing positioning of a motor control device according to an embodiment of the present invention.

In FIG. 1, a block diagram is shown for a case of detecting spindle failure of a machine tool using a servo control device 22 according to the present embodiment. A spindle 10 of the machine tool is rotatably supported by a bearing 11, and is rotatable about a shaft of the spindle 10. Furthermore, the machine tool according to the present embodiment includes a servomotor 20 for positioning the spindle 10, and it is possible to drive a feed shaft 21 to decide the position of the spindle 10, by causing this servomotor 20 to rotate.

As shown in FIG. 1, the machine tool according to the present embodiment controls the servomotor 20 using this servo control device 22. In addition, the control output that is outputted by the servo control device 22 is amplified by an amplifier 24, and then outputted to the servomotor 20. In addition, a feedback signal is outputted to the servo control device 22 from the servomotor 20 (refer to FIG. 1).

The technical matter of the present embodiment is the matter of the servo control device 22 detecting spindle failure by analyzing the feedback signal obtained from the servomotor 20. According to such a configuration, it is possible to detect spindle failure with a simple configuration, without requiring to equip a separate sensor and/or analysis device as in the conventional technology. For example, according to such a configuration, the servo control device 22 can analyze the feedback signal of the positioning servomotor 20 in the same direction as vibration in the thrust direction occurring during spindle failure. Then, as a result of this analysis, the servo control device 22 determines that spindle failure has occurred in the case of the signal intensity for vibration in the thrust direction being greater than a predetermined threshold, and can output a failure detection signal externally.

In addition, although information of the spindle state and a signal indicating analysis start, etc. is supplied from outside to the servo control device 22, the operations using these will be described in detail later in the explanation of the analysis/detection operation of spindle failure. It should be noted that the servo control device 22 corresponds to a preferred example of the servo control device in the claims. In addition, the servomotor 20 corresponds to a preferred example of a positioning servomotor in the claims.

2. Configuration/Operation of Servo Control Device 22

Figure 2:
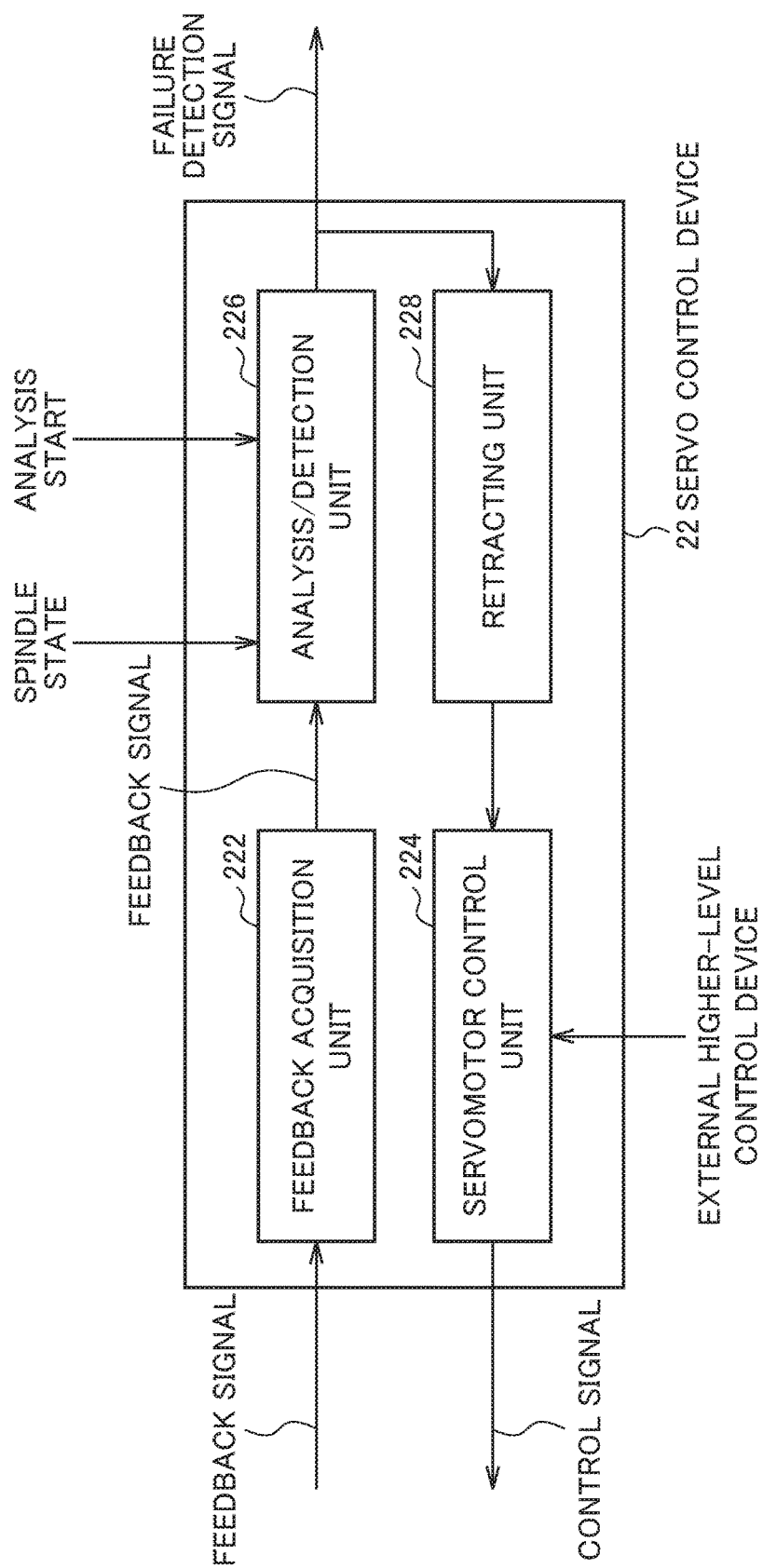
FIG. 2 is a view showing constitutional blocks of the motor control device according to the embodiment of the present invention.

In FIG. 2, the block diagram of the servo control device 22, which is a characteristic configuration in the present embodiment, is shown. The servo control device 22 is preferably configured by a controller, for example, each part shown in FIG. 2 is preferably configured from hardware of a computer (CPU, and interface with outside), and/or programs (program realizing each function of the servo control device 22).

Figure 3:
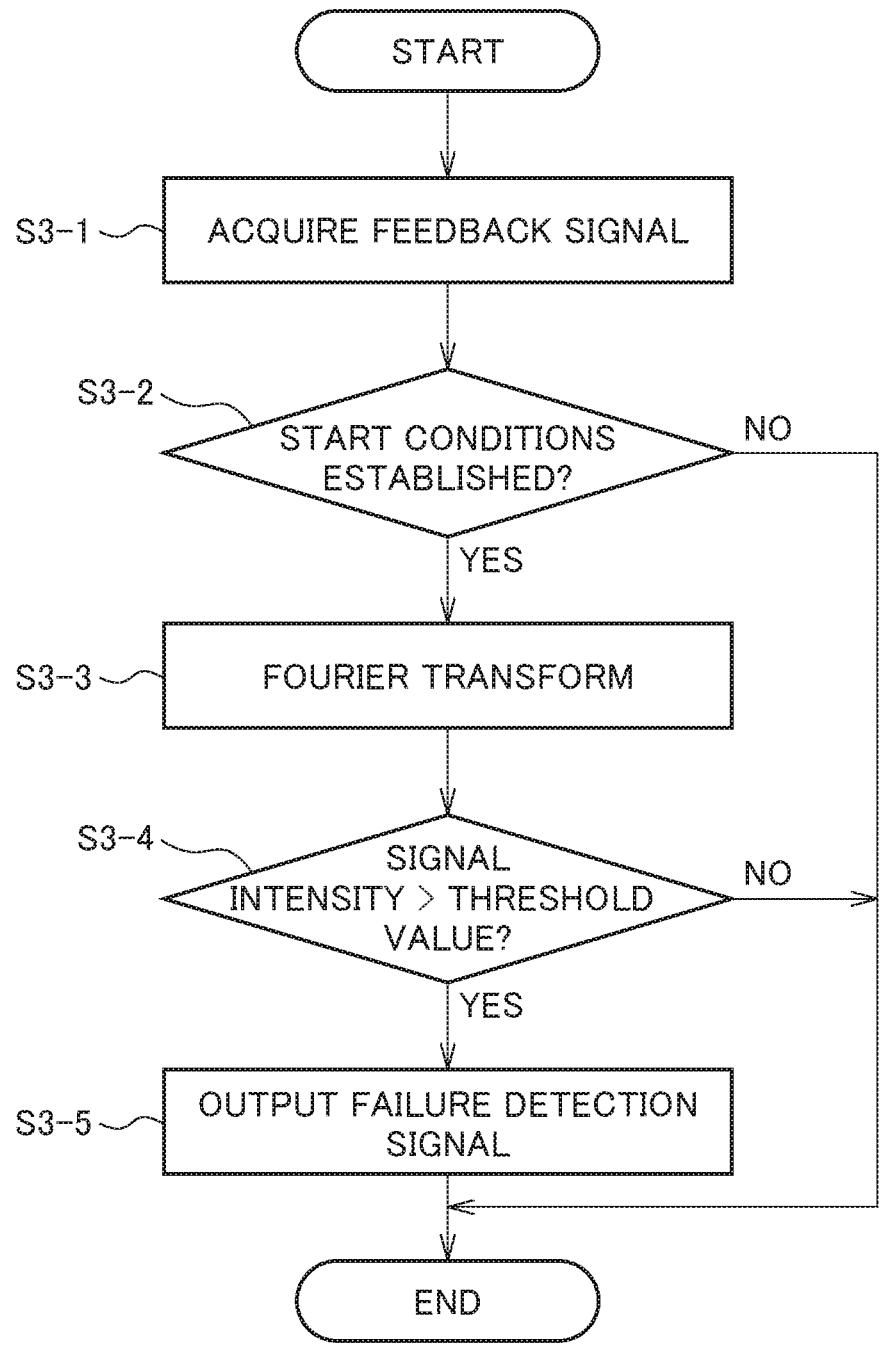
FIG. 3 is a view showing a flowchart showing operations of the motor control device according to the embodiment of the present invention.
Figure 4:
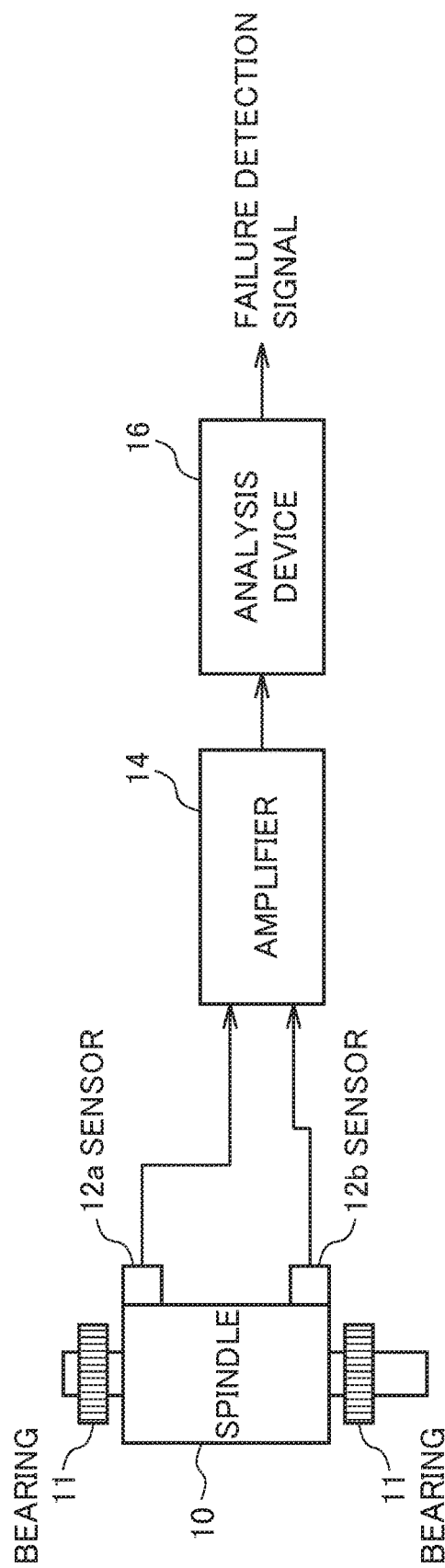
FIG. 4 is a view showing the configuration of conventional equipment upon detecting spindle failure.

As shown in FIG. 2, the servo control device 22 includes a feedback acquisition unit 222, servomotor control unit 224, analysis/detection unit 226, and retracting unit 228. In addition, a flowchart representing the operations of the feedback acquisition unit 222, and analysis/detection unit 226 is shown in FIG. 3. Hereinafter, configurations/operations of each part of the servo control device 22 will be explained based on FIGS. 2 and 3.

(2.1 Feedback Acquisition Unit)

The feedback acquisition unit 222 is an interface that receives the feedback signal supplied from the servomotor 20, and it is suitable to use the I/O interface of a computer. In addition, in the case of the feedback signal outputted from the servomotor 20 being an analog signal, the feedback acquisition unit 222 may include an AD conversion function that converts this into a digital signal. The feedback acquisition unit 222 supplies the feedback signal acquired in this way to the analysis/detection unit 226. The feedback signal outputted by the servomotor 20 can employ at least one type of signal among any of the electrical current value, velocity or position of the servomotor 20. These signals are signals representing operations of the servomotor 20; therefore, if analyzing any of the signals, it is considered possible to more accurately detect spindle failure. The feedback acquisition unit 222 supplies these signals to the analysis/detection unit 226 after converting into digital signals as necessary. The acquisition operation of feedback signals by this feedback acquisition unit 222 corresponds to Step S3-1 in FIG. 3.

The feedback acquisition unit 222 is configured by an I/O interface, or hardware such as an AD conversion means as mentioned above; however, it may be configured from a program controlling this I/O interface, AD conversion means, etc., and a CPU of a computer executing this program. It should be noted that the feedback acquisition unit 222 corresponds to a preferred example of the feedback acquisition unit in the claims.

(2-2. Servomotor Control Unit)

The servomotor control unit 224 outputs a control signal of the servomotor 20 in accordance with commands from an external higher-level control device which is not illustrated. The amplifier 24 in FIG. 1 amplifies the control signal up to the electrical power that can drive the servomotor 20, and applies the amplified control signal to the servomotor 20. This servomotor control unit 224 is configured from an interface that outputs a control signal to outside, a program making the control signal based on a command from a higher-level control device, and the CPU of a computer executing this program.

(2-3. Analysis/Detection Unit)

The analysis/detection unit 226 analyzes the feedback signal acquired by the feedback acquisition unit 222, and detects spindle failure. In the present disclosure, this processing is called analysis/detection processing. This analysis/detection unit 226, first, determines whether a condition for starting analysis/condition processing is established. This determination processing corresponds to Step S3-2 in FIG. 3. In this determination processing of Step S3-2, the analysis/detection unit 226 determines whether the condition for starting processing is established based on any of the following states.

(a) Operating State of Servomotor 20

In the case of the servomotor 20 entering an operating state, it starts the processing of analysis/detection. Whether or not the servomotor 20 is an operating state can be known if examining the feedback signal.

(b) Operating State of Spindle (Expressed by "Spindle State" in FIG. 2)

In the case of the spindle 10 entering an operating state, it starts the processing of analysis/detection. Whether or not the spindle 10 is an operating state can be known by various methods. For example, it is suitable to know whether or not the spindle 10 is an operating state by the signal from the higher-level control device (numerical control, etc.).

(c) State of signal representing analysis start from higher-level control device (expressed by "analysis start" in FIG. 2)

According to a signal of analysis start from outside, it performs the start of processing of analysis/detection. The higher-level control device is preferably a numerical control, etc.; however, it may be various computers or terminals operated by an operator.

In the present embodiment, in the case of any condition being established among these three types of conditions (a), (b) and (c), the analysis/detection processing is started. In other words, the timing for analyzing the feedback signal and detecting failure of the spindle is determined based on these conditions. However, according to the application or machining target of the machine tool, it may be determined by examining not three types, but rather only any one condition (e.g., (a) operating state of servomotor 20). In addition, for example, the processing of analysis/detection may be started by referencing another condition other than the three types. As a result of such determination, in the case of determining that at least any one condition for starting processing is established, the processing advances to Step S3-3, and starts analysis. On the other hand, in the case of none of the conditions being established, the processing ends without the analysis processing starting. In the case of any condition for starting analysis/detection processing being established, the analysis/detection unit 226 Fourier transforms the feedback signal to convert to a signal of a frequency range in Step S3-3.

Next, in Step S3-4 of FIG. 3, the analysis/detection unit 226 extracts a spectrum of a predetermined frequency range from a signal converted into a frequency range, and inspects the signal intensity thereof. In the case of spindle failure occurring, since vibration, etc. of the spindle 10 may occur as mentioned above, it is possible to efficiently detect failure of the spindle 10 if extracting and inspecting a portion of this vibration from the feedback signal such as the electrical current value of the servomotor 20. This vibration is known to often be a specific frequency. Therefore, if extracting a spectrum of a predetermined frequency range from the signal converted into a signal of a frequency range, and then inspecting the signal intensity thereof, it is possible to know whether the vibration of this specific frequency is occurring. For example, in the case of the signal intensity of the spectrum of predetermined frequency range exceeding a predetermined first threshold, it is determined as vibration of a specific frequency generating, and the processing advances to Step S3-5. In other words, the analysis/detection unit 226 determines that spindle failure was detected, and advances to Step S3-5 in order to output a failure detection signal.

In Step S3-5, this failure detection signal is outputted. This failure detection signal may be supplied to the external higher-level control device and/or various inspection devices, as well as being supplied to the retracting unit 228 described later. It is thereby possible to rapidly perform processing related to spindle failure. Generally, it is suitable to issue a warning that spindle failure has occurred to inform the operator, etc. In addition, it is preferable to perform processing such as stopping the machine tool and outputting a message urging replacement of components, etc., or illuminating a warning lamp. On the other hand, as a result of inspection in Step S3-4, in the case of the signal intensity not exceeding the predetermined first threshold, the processing ends as is without outputting a failure detection signal.

In the case of spindle failure such as failure of a bearing as mentioned above, a signal of a specific frequency (vibration) different from the normal operation of the servomotor 20 is expressed in the feedback signal. In the present embodiment, in order to detect this signal, it is subjected to Fourier transformation, and only the spectrum of a predetermined frequency range shall be extracted so as to facilitate inspecting the signal of specific frequency. If examining the signal intensity of this spectrum, it is possible to easily determine whether or not a signal of the above-mentioned specific frequency (vibration) is occurring, and with this, it is possible to perform detection of spindle failure efficiently. Since which frequency range is extracted differs according to each machine tool, and servomotor 20 used, it is preferable to adjust to match the actual machine tool and work contents, characteristics of the servomotor 20, frequencies of vibration occurring during failure, etc. In addition, the aforementioned predetermined first threshold is also preferably adjusted to match the actual machine tool and work contents, characteristics of the servomotor 20, etc. It should be noted that the analysis/detection unit 226 corresponds to a preferred example of an analysis/detection unit in the claims.

(Other Example of Failure Detection Determination (Example of Other Processing in Step S3-4))

In the above-mentioned embodiment, in a case of the signal intensity of the spectrum of a predetermined frequency range being larger than the predetermined threshold, it is determined as spindle failure (Step S3-4). However, in the case of a great change occurring in the value of the signal intensity, it is also suitable to determine as spindle failure. In order to execute such processing, for example, it is also suitable to compare the current signal intensity with the initial signal intensity, and to determine as spindle failure in the case of the difference therebetween being greater than a predetermined second threshold. In order to execute such processing, it is sufficient to store the initial signal intensity in a predetermined storage unit, and compare the detected signal intensity with the initial signal intensity thereof successively.

Therefore, in the case of executing such processing, Step S3-4 explained above becomes the following such processing.

In a case of performing the original Step S3-4 initially, the signal intensity of the spectrum of a predetermined frequency range is stored in a predetermined storage unit. Herein, the stored signal intensity becomes the "initial signal intensity" explained above. Herein, initial means the first after powering up (or after resetting) the present servo control device 22; however, resetting may be performed as appropriate by the operator to arbitrarily establish the servo control device 22 in the "initial" state.

In the case of processing the original Step S3-4 for the second time or later, the signal intensity of the spectrum of a predetermined frequency range is compared with the "initial signal intensity" stored in the predetermined storage unit to obtain the difference therebetween. In the case of this difference being greater than a predetermined second threshold, i.e. in a case of the current signal intensity being greater than a value arrived at by adding the second predetermined threshold to the initial signal intensity, the processing advances to Step S3-5 to execute the processing for outputting the failure detection signal. On the other hand, in the case of this difference not being greater than the predetermined second threshold, the processing is ended without outputting the failure detection signal. According to such processing, since spindle failure is detected according to the variation in "current signal intensity" compared to "initial signal intensity", it is possible to efficiently detect even spindle failure occurring suddenly.

The analysis/detection unit 226 is configured from a program governing the processing explained thus far, and a CPU executing this program. In addition, in the case of executing processing for storing the initial signal intensity as mentioned above, the analysis/detection unit 226 also includes a storage unit that stores this initial signal intensity. This storage unit may jointly use the storage unit for storing programs, or a separate storage unit may be equipped. It should be noted that, in the present embodiment, as the storage unit used for storing various programs and "initial signal intensity", it is possible to employ a semiconductor storage device, magnetic/optical storage devices, or the like. In addition, the analysis/detection unit 226 includes a predetermined interface (hardware) for outputting a failure detection signal to outside; however, this interface may employ a general I/O interface such as for a computer. This interface corresponds to a preferred example of the notification unit in the claims, and may output a failure detection signal from this interface to the higher-level control device, for example.

In addition, the servo control device 22 may include an alarm output means or warning lamp for notifying of spindle failure to outside (including the operator), in response to a failure detection signal. This alarm output means and warning lamp correspond to preferred examples of the notification unit in the claims.

(2-4. Retracting Unit)

The failure detection signal outputted by the analysis/detection unit 226 is also supplied to the retracting unit 228. The retracting unit 228 outputs a command such that causes the spindle 10 to retract from the workpiece, when notified that spindle failure has occurred according to the failure detection signal. This command is supplied to the servomotor control unit 224, and the servomotor control unit 224 causes the spindle 10 to retract from the workpiece by controlling the servomotor 20, etc., based on this command.

According to such operation, in the case of spindle failure being detected, since it is possible to cause the spindle 10 to retract from the workpiece rapidly, it is expected to prevent further deterioration of the spindle failure. This retracting unit is configured from a program for generating a retraction command, and the CPU of a computer executing this program. It should be noted that the retracting unit 228 corresponds to a preferred example of the retracting unit in the claims.

(Retraction Processing of Spindle 10 by Higher-Level Control Device)

In the above explanation, the retracting unit 228 is configured so as to generate a command for causing the spindle 10 to retract from the workpiece; however, it may be configured so as to generate a retraction command from an external higher-level control device. In this case, it is suitable for the external higher-level control device to be a configuration that includes the retracting unit that, when receiving a failure detection signal from the servo control device 22, generates a command for causing the spindle 10 to retract from the workpiece to cope therewith. The servomotor control unit 224 having received this command causes the spindle 10 to retract from the workpiece in accordance with the command.

As explained above, according to the present embodiment, since the servo control device 22 detects spindle failure based on the feedback signal, it is possible to efficiently detect spindle failure without requiring external sensors or a separate failure analysis device. It should be noted that the servo control device 22 of the present embodiment may be configured by a computer. Each part of the servo control device 22 can be configured from programs realizing the functions of each of the above-mentioned parts, a CPU executing these programs, and the required hardware. In this case, a non-transitory computer readable medium encoded with these programs corresponds to a preferred example of the non-transitory computer readable medium encoded with a computer program in the claims.

3. Modified Example (1) In the above-mentioned embodiment, a signal representing the electrical current, velocity or position of the servomotor 20 is employed as the feedback signal; however, so long as being a signal representing the operation of the servomotor 20, another signal may be employed as the feedback signal. In addition, "velocity" may be angular velocity, or may be revolution speed (rpm, etc.). In addition, "position" may be rotation angle, or may be rotation amount (angle). Furthermore, among the electrical current, velocity and position, only one type of signal may be employed, or two or more types may be employed. In the case of employing two or more types of signals as the feedback signal, and in a case of the signal intensity thereof being greater than the predetermined first threshold for at least one type of signal, it may be determined that spindle failure was detected.

(2) In the above-mentioned embodiment, for example, an example of inspecting whether the signal intensity of a spectrum of a predetermined frequency range is greater than a predetermined first threshold is explained. Herein, signal intensity may be the amplitude value of this spectrum, or may be the root mean squared value, for example. Furthermore, this signal intensity may be the average value of this spectrum, or may be the peak value.

Although an embodiment of the present invention has been explained in detail above, the aforementioned embodiment is merely illustrating a specific example upon implementing the present invention. The technical scope of the present invention is not to be limited to the embodiment. The present invention is capable of various modifications within a scope not departing from the gist thereof, and these are also encompassed by the technical scope of the present invention.

EXPLANATION OF REFERENCE NUMERALS

10 spindle
11 bearing
12, 12*a*, 12*b* sensor
14, 24 amplifier
16 analysis device
20 servomotor
21 feed shaft
22 servo control device
222 feedback acquisition unit
224 servomotor control unit
226 analysis/detection unit
228 retracting unit

What is claimed is:

1. A servo control device that detects failure of a spindle in a machine tool including the spindle, a feed shaft, and a positioning servomotor that is installed to the feed shaft and is for deciding a position of the spindle, the servo control device comprising:
   a feedback acquisition part that acquires a feedback signal of the positioning servomotor; and
   an analysis/detection unit that analyzes the feedback signal acquired to detect failure of the spindle,
   wherein the analysis/detection unit conducts Fourier transformation on the feedback signal to obtain a spectrum of a predetermined frequency range, and determines that failure has occurred in the spindle in a case of a signal intensity of the spectrum of the predetermined frequency range exceeding a predetermined first threshold,
   the predetermined frequency range is adjusted according to the machine tool, contents of work performed by the machine tool, characteristic of the servomotor, and frequency of vibration occurring in the case of the spindle failure, and
   the predetermined first threshold is adjusted according to the machine tool, contents of work performed by the machine tool, and characteristic of the servomotor, and
   wherein the analysis/detection unit analyzes the feedback signal based on an operating state of the positioning servomotor, and determines a timing for detecting a failure of the spindle that corresponds to damage of a bearing of the spindle.

2. The servo control device according to claim 1, wherein the feedback signal is at least one of any type of signal among an electrical current, velocity and position of the positioning servomotor.

3. The servo control device according to claim 1, further comprising a notification unit that externally notifies of failure of the spindle detected by the analysis/detection unit.

4. The servo control device according to claim 1, further comprising a notification unit that externally outputs a failure detection signal, in a case of the analysis/detection unit detecting failure of the spindle.

5. The servo control device according to claim 1, further comprising a retracting unit that outputs a command causing the spindle to retract from a workpiece, in a case of the analysis/detection unit detecting failure of the spindle.

6. A method for detecting failure of a spindle of a machine tool including the spindle, a feed shaft, and a positioning servomotor that is installed to the feed shaft and is for deciding a position of the spindle, the method comprising the steps of:
   acquiring a feedback signal of the positioning servomotor; and
   analyzing the feedback signal thus acquired to detect failure of the spindle,
   wherein, in the analyzing of the feedback signal, Fourier transformation is conducted on the feedback signal to obtain a spectrum of a predetermined frequency range, and it is determined that the failure has occurred in the spindle in a case of a signal intensity of the spectrum of the predetermined frequency range exceeding a predetermined first threshold,
   the predetermined frequency range is adjusted according to the machine tool, contents of work performed by the machine tool, characteristic of the servomotor, and frequency of vibration occurring in the case of spindle failure, and the predetermined first threshold is adjusted according to the machine tool, contents of work performed by the machine tool, and characteristic of the servomotor, and wherein, in the analyzing of the feedback signal, the feedback signal is analyzed based on an operating state of the positioning servomotor, and a timing for detecting a failure of the spindle is determined that corresponds to damage of a bearing of the spindle.

7. A non-transitory computer readable medium encoded with a computer program enabling a computer to operate as a servo control device that detects failure of a spindle of a machine tool including the spindle, a feed shaft, and a positioning servomotor that is installed to the feed shaft and is for deciding a position of the spindle, wherein the computer program causes the computer to execute:

feedback acquisition processing of acquiring a feedback signal of the positioning servomotor; and analysis/detection processing of analyzing the feedback signal thus acquired to detect failure of the spindle, wherein, in the analysis/detection processing, Fourier transformation is conducted on the feedback signal to obtain a spectrum of a predetermined frequency range, and it is determined that the failure has occurred in the spindle in a case of a signal intensity of the spectrum of the predetermined frequency range exceeding a predetermined first threshold, the predetermined frequency range is adjusted according to the machine tool, contents of work performed by the machine tool, characteristic of the servomotor, and frequency of vibration occurring in the case of spindle failure, and the predetermined first threshold is adjusted according to the machine tool, contents of work performed by the machine tool, and characteristic of the servomotor, and wherein, in the analysis/detection processing, the feedback signal is analyzed based on an operating state of the positioning servomotor, and a timing for detecting failure of the spindle is determined that corresponds to damage of a bearing of the spindle.

* * * * *